F. H. B. BYRNE.
MUSIC NOTATION.
APPLICATION FILED APR. 24, 1916.
1,355,087.
Patented Oct. 5, 1920.
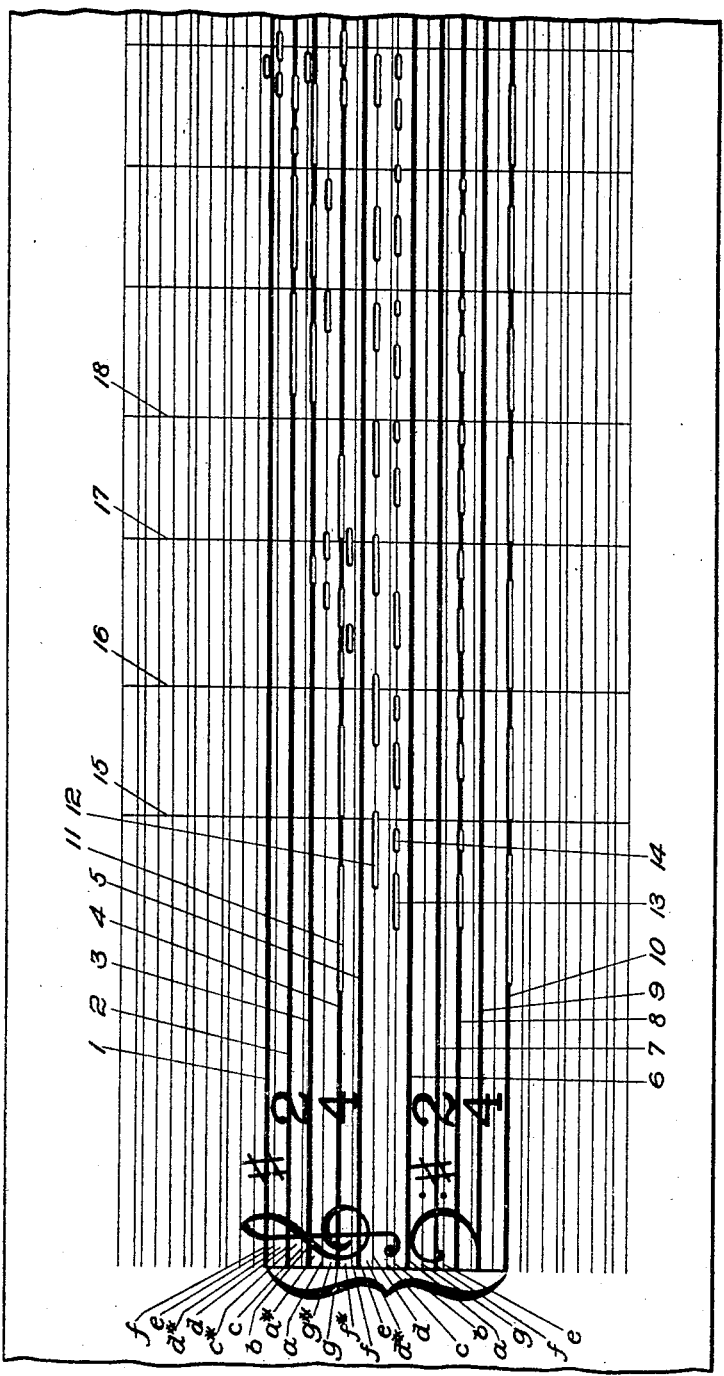

UNITED STATES PATENT OFFICE.

FRANCIS H. B. BYRNE, OF NEW YORK, N. Y., ASSIGNOR TO AMERICAN PIANO COMPANY, OF NEW YORK, N. Y., A CORPORATION OF NEW JERSEY.

MUSICAL NOTATION.

1,355,087.     Specification of Letters Patent.     Patented Oct. 5, 1920.

Application filed April 24, 1916. Serial No. 93,120.

*To all whom it may concern:*

Be it known that I, FRANCIS H. B. BYRNE, a subject of the King of Great Britain, and now a resident of the city of New York, in the county and State of New York, have invented an Improvement in Musical Notation, of which the following is a specification.

This invention relates to a new form of musical notation particularly adapted for rendering readable, for example, the record of a manual performance of a pianist. It is especially adapted to perforated music rolls.

Suitable recording apparatus may be operatively connected with the keys of a piano for the purpose of recording the behavior of the keys when manipulated by a player. For instance, apparatus has been devised whereby the depression of a piano key to strike a note would cause a record line to be drawn on the sheet until the key was released to terminate the sounding of its corresponding tone. The relative positions and lengths of such lines made by the keys during the playing of the composition represent the relative sequence and durations of their respective tones.

Such records have been utilized in designing perforated music sheets, for use in automatic piano players and the like, by which to reproduce, with at least a fairly close approximation, the player's performance.

A playing artist makes his own distinctive interpretation of a composition and embodies that interpretation in his playing, which is characterized by differences in durations of and intervals between tones different from those expressed in the score; such differences are readily detectable. Likewise, if two artists play the same composition from the same score, the respective records of their playings may represent substantial differences in durations of and intervals between tones; and such differences may represent the different respective interpretations.

One of the objects of the present invention resides in a new form of musical notation from which the record of a performer's playing may be readily read and which may be compared with the ordinary score from which he played, for the purpose of ascertaining precisely the performer's interpretation.

One practicable embodiment of this invention is shown in the accompanying drawing, which illustrates a sheet having thereon Edvard Grieg's manual performance of "Berceuse" Op. 38, No. 1, in my new notation, arranged by Edvard Grieg himself. In other words, the new notation represents Grieg's interpretation of one of his own compositions. Obviously, such a notation is of the greatest value, particularly in that it embodies in a permanent and readily readable form a renowned artist's interpretation.

In the drawing, the lines 1, 2, 3, 4 and 5 correspond to the five lines of the ordinary treble staff. That is to say, the line 1 indicates the note $f$; line 2 the note $d$; line 3 the note $b$; line 4 the note $g$; and line 5 the note $e$. Similarly the lines 6, 7, 8, 9, and 10 correspond to the five lines of the ordinary bass staff. The C clef and the bass clef are indicated in their usual relations to the treble and bass staffs respectively; and the sharp symbols as shown in the drawing indicate that the composition was played in the key of one sharp. The tempo marks indicating "two-four" time are used to indicate the general basic tempo.

The lines indicated by the reference characters 1 to 10 inclusive, are preferably drawn on the sheet with an exaggerated thickness or in a distinctive color to render them readily distinguishable from the other lines indicated in the drawing which correspond to other notes, as presently described.

In a new musical score embodying this invention it is preferred to use no symbols for sharps or flats, but instead to have the staff lines increased in number to indicate all of the natural notes and to have spaces between the lines indicate sharps and flats. In other words, the lines (including the lines 1 to 10 inclusive and also the finer lines) correspond to the white keys of a piano as exemplified by the lines $d$, $e$, $f$, $g$, $a$, $b$, etc. indicated at the left-hand end of the drawing.

It will be noted that the lines $e$, $f$ are close together; and that the lines $b$ and $c$ are close together. This indicates the half interval between the notes $e$ and $f$ and the notes *b* and *c*. In like manner the half intervals are indicated throughout the new staff arrangement by placing the two lines close together. The other spaces between the lines are uniform and of the same width as that between the lines *f*, *g*, for instance, and each of these wider spaces indicates the sharp of the note indicated by the line below the space and the flat of the note indicated by the line above the space. For example, between the lines *f* and *g* in the drawing, the space indicates *f*-sharp or *g*-flat, as the case may be. Thus it will be seen that each of the wider spaces in the drawing corresponds to one of the black keys on a piano.

With the described arrangement, one familiar with the piano key-board, after a little study, may readily identify such note symbols as may be used by their locations with reference to the heavy normal staff lines 1, 2, 3, 4, etc., and the intervening lines and wider spaces. Of course, even a skilled pianist would be required to familiarize himself to some extent with the system of notation represented in the score embodying this invention.

As shown in the drawing, the note symbols consist of perforations like the perforations used in perforated music sheets, each perforation being appropriately located relative to the staff lines to represent the note which that perforation is intended to play; and the relative lengths of perforations indicating relative durations of their corresponding notes.

For example, the perforation 11 located upon the staff line 4, represents the note *g*. The perforation 12 located upon another staff line represents the note *d*. The perforations 13 and 14 represent the note *b* sounded and then re-sounded. One skilled in the art may readily identify the notes represented by the other perforations. The left-hand ends of the perforations indicate by their relative positions the sequence in which the notes are to be played,—in other words, indicate the intervals between the initial soundings of their respective notes, while the right-hand ends indicate their termination.

Bars 15, 16, 17, 18, etc. are preferably employed to divide the illustrative score into measures corresponding to the basic tempo indicated by the tempo marks. This assists the player to understand the fundmental rhythm of the piece. It will be noted that the measure between the bars 15 and 16 is substantially shorter than the initial measure preceding the bar 15 and is also shorter than the measure between the bars 16 and 17, indicating that the tempo of the first measure is somewhat accelerated for the second measure; and that of the second measure is somewhat retarded for the third measure and so on. This differs obviously from the ordinary musical score in which the various measures are supposed to be of the same time value except where accompanied by accelerando and similar instructions which merely indicate generally an accelerated or retarded tempo but without conveying any definite instruction as to the relative time values of the different measures, such as afforded by the illustrative notation in the drawing.

It will be noted in a number of instances that note symbols, for instance the perforation 12, are prolonged from one measure into the next indicating a continuation of a tone beyond what would be indicated upon the ordinary score. In many cases the note symbols would extend much farther into a measure or measures following those in which they originate, indicating the sustaining of individual notes. This is substantially different from any instruction afforded by slurs or pedal indications such as are used in ordinary musical notation.

It will be apparent to those skilled in the art that when a musical score embodying this invention is made up by reference to a record of an artist's performance, the variations in tempo and the characteristics by which the tone endurance and dynamics by which the artist impresses his personal interpretation upon the rendition are all graphically represented. For instance, as already pointed out, certain measures are indicated in the illustrative score of the drawing as covering a greater period of time than other measures, although an ordinary score of the composition played would indicate measures as having uniform time values, unless modified by verbal directions.

A master record of an artist's performance may be made upon a moving sheet corresponding in general to a perforated music sheet which may be demarked as already suggested by lines, the relative positions of which represent the musical sequence of the notes and the respective lengths of which represent the relative durations of the notes. By reference to such a record a perforated sheet may be made, for instance, having such perforations as those shown in the drawing. Then the appropriate staff lines, as many of them as may be necessary, may be applied to the perforated sheet so as to render the positions of the perforations upon the staff readily recognizable so that their respective notes may be identified with sufficient rapidity to constitute the whole score a readable notation.

I claim as my invention:

1. As a new article of manufacture, a musical notation sheet having the double capacity of presenting a musical composition in readily readable notation and of controlling the mechanical rendition of said musical composition on a mechanical musical instrument, characterized by a series of note-producing devices for coöperation with a mechanical musical instrument, said devices serving to indicate legibly the sequence and relationship of successive notes and the durations of respective notes; representations of a musical staff forming part of the sheet and constructed and arranged to coöperate with said devices and indicate legibly the pitch of the notes corresponding thereto; and bars associated with the musical staffs and said devices, to indicate an approximate division of the intended tempo into measures, but without necessary regard to the duration of individual notes indicated by said devices: whereby the sheet as a whole is capable of controlling a mechanical rendition of the embodied composition and also of representing legibly the characteristics of said rendition.

2. As a new article of manufacture, a musical notation sheet having the double capacity of representing an artist's interpretation of a musical composition in readily readable notation and of controlling the musical reproduction of said interpretation on a mechanical musical instrument, characterized by a series of note-producing devices for coöperation with a mechanical musical instrument, said devices being constructed and arranged to reproduce the interpretative tempo, note durations, and note sequences without necessary regard to corresponding characteristics in the original composition so interpreted: representations of a musical staff forming part of the sheet and constructed and arranged to coöperate with said devices and indicate legibly the pitch of the notes corresponding thereto: and bars associated with the musical staffs and said devices, corresponding to the interpretative division of the tempo into measures without necessary regard to the measures of the original composition: whereby the sheet as a whole is capable of controlling a mechanical reproduction of the embodied interpretation and also of representing legibly the distinctive characteristics of said interpretation to permit the interpretation to be studied and analyzed both audibly and visually.

3. As a new article of manufacture a musical notation sheet having the double capacity of presenting a musical composition in readily readable notation and of controlling the mechanical rendition of said musical composition on a mechanical musical instrument, characterized by a series of note perforations for coöperation with a mechanical musical instrument, said perforations having lengths corresponding to the intended durations of their respective notes, and arranged to play said notes in desired sequence and tempo: representations of a musical staff forming part of the sheet and constructed and arranged to coöperate with said perforations and indicate legibly the pitch of the notes corresponding to the perforations: and bars associated with the musical staffs and said perforations, to indicate an approximate division of the intended tempo into measures arranged to indicate by the distance separating adjacent bars the desired variations in tempo: whereby the sheet as a whole is capable of controlling a mechanical rendition of the embodied composition and also of representing legibly the characteristics of said rendition including variations in tempo indicated legibly by the relative spacing of the bars.

In testimony whereof, I have signed my name to this specification this 21st day of April, 1916.

FRANCIS H. B. BYRNE.